(12) United States Patent
Shaari et al.

(10) Patent No.: US 8,734,713 B2
(45) Date of Patent: May 27, 2014

(54) ENERGY STORAGE CERAMIC DIELECTRIC COMPONENT AND METHOD THEREOF

(75) Inventors: Abdul Halim Shaari, Selangor Darul Ehsan (MY); Walter Charles Primus, Selangor Darul Ehsan (MY); Wan Mohd Daud Wan Yusoff, Selangor Darul Ehsan (MY); Zainal Abidin Talib, Selangor Darul Ehsan (MY); Elias Saion, Selangor Darul Ehsan (MY)

(73) Assignee: Universiti Putra Malaysia, Selangor Darul Ehsan (MY)

( * ) Notice: Subject to any disclaimer, the term of this patent is extended or adjusted under 35 U.S.C. 154(b) by 32 days.

(21) Appl. No.: 13/320,805

(22) PCT Filed: Jun. 9, 2010

(86) PCT No.: PCT/MY2010/000094
§ 371 (c)(1),
(2), (4) Date: Nov. 16, 2011

(87) PCT Pub. No.: WO2011/002273
PCT Pub. Date: Jan. 6, 2011

(65) Prior Publication Data
US 2012/0071314 A1 Mar. 22, 2012

(30) Foreign Application Priority Data
Jul. 3, 2009 (MY) .............................. PI20097003

(51) Int. Cl.
*C04B 35/468* (2006.01)
*C04B 35/465* (2006.01)

(52) U.S. Cl.
USPC ...................................................... 264/615

(58) Field of Classification Search
USPC ........................................................ 264/615
See application file for complete search history.

(56) References Cited

U.S. PATENT DOCUMENTS

| | | | | |
|---|---|---|---|---|
| 2,350,534 A * | 6/1944 | Rosinger | ....................... | 366/274 |
| 3,609,483 A * | 9/1971 | Smyly | ........................... | 361/320 |
| 4,148,853 A * | 4/1979 | Schuber | ..................... | 264/37.29 |
| 4,265,841 A * | 5/1981 | Fujimori et al. | .............. | 264/430 |
| 4,582,814 A * | 4/1986 | Thomas | ........................ | 501/136 |
| 4,706,163 A * | 11/1987 | Maher | ........................ | 361/321.4 |
| 4,816,072 A * | 3/1989 | Harley et al. | ............. | 106/287.18 |
| 5,928,601 A * | 7/1999 | Miyake et al. | ................ | 264/659 |
| 6,107,227 A * | 8/2000 | Jacquin et al. | ................ | 501/138 |

(Continued)

FOREIGN PATENT DOCUMENTS

WO  WO 03/080535 A1  10/2003
WO  WO 2004/110952 A1  12/2004

*Primary Examiner* — Joseph S Del Sole
*Assistant Examiner* — Russell Kemmerle, III
(74) *Attorney, Agent, or Firm* — Muncy, Geissler, Olds & Lowe, P.C.

(57) ABSTRACT

The present invention is a new composition of matter and can be used as components of a capacitor. The dielectric properties possess in this material has improved tremendously as compared to the existing component. The finding of high dielectric permittivity in the present invention ceramic according to its formulation and processing technique that can operate or use at wide range frequencies and temperatures are very useful in electronic and electrical devices. The present invention is best for applications at the range of temperatures. The permittivity is recorded at 1 kHz are between ~20,000 to ~54,000 and almost constant over three decade of frequency. Thus, the dielectric permittivity obtained can be used as energy storage, sensor, electric filter, etc., besides minimizing the devices size.

10 Claims, 3 Drawing Sheets

(56) References Cited

U.S. PATENT DOCUMENTS

| | | | |
|---|---|---|---|
| 6,933,256 B2 * | 8/2005 | Fukui et al. | 501/136 |
| 7,276,130 B2 * | 10/2007 | Hibi et al. | 156/89.14 |
| 8,318,623 B2 * | 11/2012 | Hill | 501/137 |
| 2007/0213202 A1 | 9/2007 | Arashi et al. | |

* cited by examiner

ENERGY STORAGE CERAMIC DIELECTRIC COMPONENT AND METHOD THEREOF

FIELD OF INVENTION

The present invention relates to energy storage with a permittivity of high dielectric with a low loss and thermal stability preferably with a wide range of frequency.

BACKGROUND OF INVENTION

A capacitor or condenser is a passive electronic component consisting of a pair of conductors separated by a dielectric. When a voltage potential difference exists between the conductors, an electric field is present in the dielectric. This field stores energy and produces a mechanical force between the plates. The effect is greatest between wide, flat, parallel, narrowly separated conductors.

An ideal capacitor is characterized by a single constant value, capacitance, which is measured in farads. This is the ratio of the electric charge on each conductor to the potential difference between them. In practice, the dielectric between the plates passes a small amount of leakage current. The conductors and leads introduce an equivalent series resistance and the dielectric has an electric field strength limit resulting in a breakdown voltage.

SUMMARY OF INVENTION

Accordingly, there is provided in the present invention a method of preparing an energy storage component with high dielectric permittivity including mixing a stoichiometric amount (preferably Lanthanum oxide ($La_2O_3$), Barium oxide (BaO), Manganese (II) oxide ($MnO_2$) and Titanium (IV) oxide ($TiO_2$) of elements and obtaining a mixture; drying the mixture to obtain dried powder; grounding the dried powder (preferably for at 30 minutes and calcined between 900° C. and 1000° C. for at least 24 hours) with calcined; obtaining calcined dried powder; pressing the calcined dried powder into a plurality of pellets; firing the pellets (preferably, between 1200° C. and 1300° C. for between 12 hours and 24 hours); repeating the above methods at least twice; later the method further includes sieving of by-product; pressing the by-product into pellet; obtaining by-product pellet; pressurizing the by-product pellet; and/or sintering the by-product pellet. Further to that, the dried mixed powder is grounded for at 30 minutes and calcined between 900° C. and 1000° C. for at least 24 hours. Indeed, the total repeated heating time is between 48 hours and 72 hours. The sieving is done with openings of 20 to 45 $\mu m^2$ and the by-product pellets having a diameter about 13 cm. The pressurizing is performed between 5 and 6 tons and the sintering is prepared at 1200° C. to 1300° C. between 2 and 12 hours Furthermore, there is provided, an apparatus for Energy storage with high dielectric permittivity, low loss, thermal stability and stable with a wide range of frequency wherein the apparatus includes a stoichiometric amount of elements and a method of preparation. The apparatus capable of having stoichiometric amount of elements is Lanthanum oxide ($La_2O_2$), Barium oxide (BaO), Manganese (H) oxide ($MnO_2$) and Titanium (IV) oxide ($TiO_2$). It is said that the stoichiometric amount of elements is mixed in a using a magnetic stirrer for at 24 hours. The apparatus is capable of having a method of preparing an energy storage component with high dielectric permittivity The present invention consists of several novel features and a combination of parts hereinafter fully described and illustrated in the accompanying description and drawings, it being understood that various changes in the details may be made without departing from the scope of the invention or sacrificing any of the advantages of the present invention.

BRIEF DESCRIPTION OF THE DRAWINGS

The present invention will be fully understood from the detailed description given herein below and the accompanying drawings which are given by way of illustration only, and thus are not limitative of the present invention, wherein.

DETAILED DESCRIPTION OF THE PREFERRED EMBODIMENTS

Figure 1:
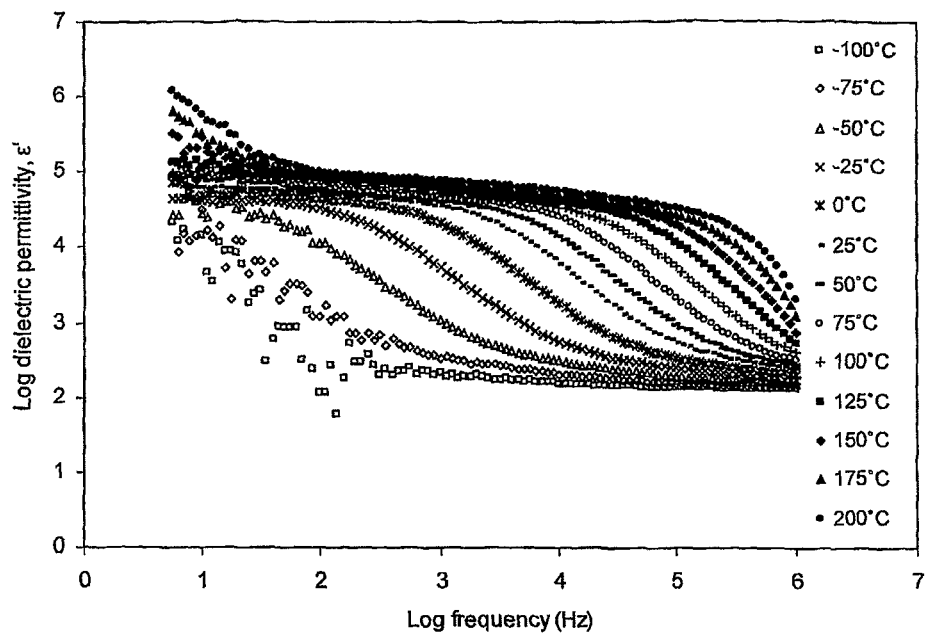
FIG. 1 is a graph diagram showing a frequency dependence of dielectric permittivity at different temperatures.
Figure 2:
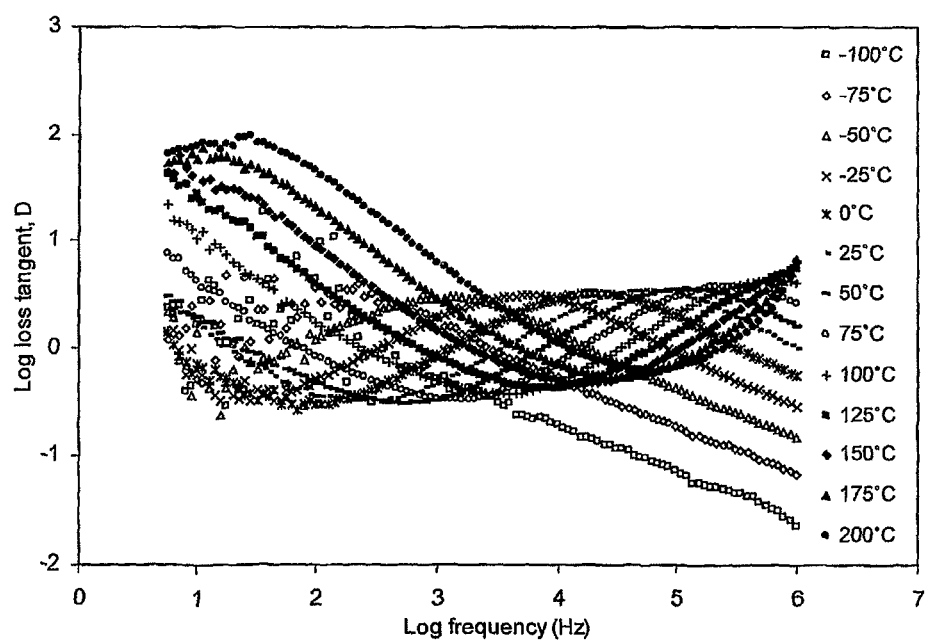
FIG. 2 is a graph diagram showing a frequency dependence of loss tangent at different temperatures.
Figure 3:
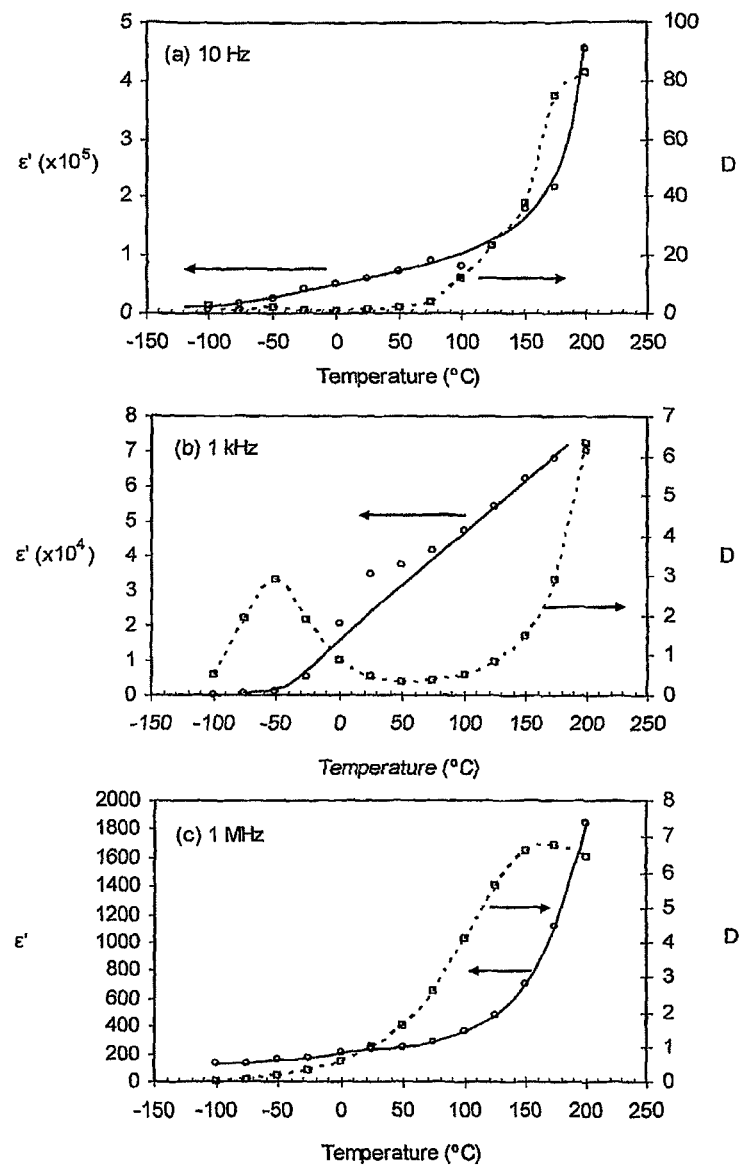
FIG. 3 is a graph diagram showing a temperature dependence of dielectric permittivity at (a) 10 Hz, (b) 1 kHz and (c) 1 MHz.
Figure 4:
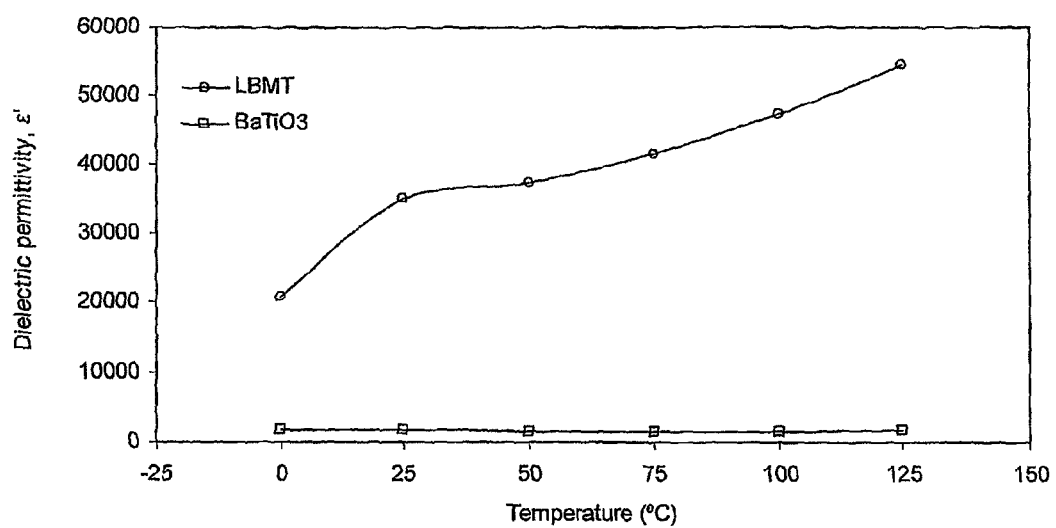
FIG. 4 is a graph diagram showing a comparison of dielectric permittivity between the present inventions LBMT with the current capacitor BaTiO3 at 1 KHz.

The present invention relates to Energy storage component and method thereof. Hereinafter, this specification will describe the present invention according to the preferred embodiments of the present invention. However, it is to be understood that limiting the description to the preferred embodiments of the invention is merely to facilitate discussion of the present invention and it is envisioned that those skilled in the art may devise various modifications and equivalents without departing from the scope of the appended claims.

The following detailed description of the preferred embodiments will now be described in accordance with the attached drawings, either individually or in combination.

The present invention is a new composition of matter $La_{0.4}Ba_{0.6}Mn_{0.4}Ti_{0.6}O_3$ oxide and can be used as components of a capacitor. The dielectric properties possess in this material has improved tremendously as compared to the existing component.

The finding of high dielectric permittivity $La_{0.4}Ba_{0.6}Mn_{0.4}Ti_{0.6}O_3$ ceramic according to its formulation and processing technique that can operate or use at wide range frequencies and temperatures are very useful in electronic and electrical devices. The present invention is best for applications at the range of temperatures 0° C. to 125° C. At this temperature, the permittivity is recorded at 1 kHz are between ~20,000 to ~54,000 and almost constant over three decade of frequency. Thus, the dielectric permittivity obtained can be used as energy storage, sensor, electric filter, etc., besides minimizing the devices size.

As a capacitor component, the present invention has a huge value of dielectric permittivity at room temperature of ~35,000 at 1 KHz, whilst the current component used is BaTiO3 which comparatively has the dielectric permittivity of ~1200 at 1 kHz.

The present invention can be used as energy storage (capacitor), sensor, electric filter, and substrate, also has good resistant property that can be used as resistor component.

For energy storage, the sample is placed between two plats and an alternating electric field is applied. For sensor application, the sample is arranged according to the Wheatstone bridge where exposure to different temperature gives different voltage to the circuit bridge. The sample also can be used as a divider between two conductors due to the insulating properties itself. It also can be used as a substrate.

The invention possesses high dielectric permittivity, low loss, thermal stability and stable with a wide range of frequency. The invention solves the problem of energy storage.

$La_{0.4}Ba_{0.6}Mn_{0.4}Ti_{0.6}O_3$ samples were prepared by conventional solid state reaction technique where a stoichiometric amount of $La_2O_3$, BaO, $MnO_2$ and $TiO_2$ were mixed together and sintered at 1300° C. to form the desire product.

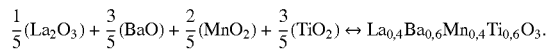

List of elements of the present invention:

| Elements | Purity (%) | Molecular weight (g/mol) | Manufacturer |
| --- | --- | --- | --- |
| Lanthanum oxide ($La_2O_3$) | 99.90 | 325.82 | Fisher Chemical |
| Barium oxide (BaO) | 99.99 | 153.34 | Aldrich |
| Manganese (II) oxide ($MnO_2$) | 99.50 | 70.94 | Alfa Aesar |
| Titanium (IV) oxide ($TiO_2$) | 99.90 | 79.88 | Alfa Aesar |

The process of sample preparation is described in detail. A stoichiometric amount of $La_2O_3$, BaO, $MnO_2$ and $TiO_2$ were thoroughly mixed using magnetic stirrer for 24 hours in acetone. The dried mixed powders were then grounded for 30 minutes and calcined at 950° C. for 24 hours. Later, the calcined powder was first grounded and then pressed into pellets before fired at 1300° C. for 24 hours. Again, the same process was repeated twice and the total of heating time is 72 hours. Finally, the powder was sieved with openings the size of 45 µm², pressed into pellets with diameter of 13 cm at a pressure of 6 tons and sintered at 1300° C. for 3 hours.

There are few limitations such as at temperature lower than 0° C., the dielectric permittivity is lower ($\epsilon_r' < 20,000$) at 1 kHz and at temperature higher than 125° C., and the dielectric loss is higher (D>0.83). Those limitations can be overcome by doping with other elements such as strontium (Sr) and/or calcium (Ca) in barium site.

TABLE 1

Values of dielectric permittivity and loss tangent at different frequencies and temperatures.

| Temperature (° C.) | 10 Hz | | 1 kHz | | 1 MHz | |
| --- | --- | --- | --- | --- | --- | --- |
| | $\epsilon'$ | D | $\epsilon'$ | D | $\epsilon'$ | D |
| −100 | 4750 | 2.76 | 210 | 0.52 | 130 | 0.02 |
| −75 | 17200 | 0.49 | 340 | 1.91 | 140 | 0.07 |
| −50 | 24620 | 1.85 | 1090 | 2.90 | 150 | 0.15 |
| −25 | 42420 | 0.58 | 5400 | 1.90 | 170 | 0.30 |
| 0 | 51540 | 0.68 | 20780 | 0.87 | 200 | 0.56 |

TABLE 1-continued

Values of dielectric permittivity and loss tangent at different frequencies and temperatures.

| Temperature (° C.) | 10 Hz | | 1 kHz | | 1 MHz | |
| --- | --- | --- | --- | --- | --- | --- |
| | $\epsilon'$ | D | $\epsilon'$ | D | $\epsilon'$ | D |
| 25 | 59320 | 1.54 | 34790 | 0.48 | 240 | 0.99 |
| 50 | 71180 | 1.72 | 37250 | 0.33 | 250 | 1.59 |
| 75 | 91950 | 3.63 | 41490 | 0.35 | 290 | 2.61 |
| 100 | 81860 | 12.17 | 47160 | 0.50 | 360 | 4.10 |
| 125 | 115080 | 23.27 | 54400 | 0.83 | 480 | 5.59 |
| 150 | 177960 | 37.52 | 62340 | 1.46 | 700 | 6.58 |
| 175 | 216520 | 75.05 | 68160 | 2.90 | 1120 | 6.77 |
| 200 | 453790 | 82.69 | 70230 | 6.31 | 1840 | 6.44 |

The invention claimed is:

1. A method of preparing an energy storage component with high dielectric permittivity wherein the method includes the steps of:
   a) mixing a stoichiometric amount of elements and obtaining a mixture;
   b) drying the mixture from step (a) to obtain dried powder;
   c) grinding the dried powder and calcining the ground dried powder;
   d) obtaining calcined dried powder;
   e) pressing the calcined dried powder into a plurality of first pellets;
   f) firing the first pellets from step (e) to form a fired product;
   g) repeating steps (c to f) at least twice using said fired product instead of said dried powder;
   h) sieving of a product resulting from step g);
   i) pressing the sieved product to obtain a plurality of uniform pellets;
   j) sintering the plurality of uniform pellets.

2. The method as claimed in claim 1 wherein, the stoichiometric amount of elements is Lanthanum oxide ($La_2O_3$), Barium oxide (BaO), Manganese (II) oxide ($MnO_2$) and Titanium (IV) oxide ($TiO_2$).

3. The method as claimed in claim 1 wherein, the stoichiometric amount of elements is mixed in a using a magnetic stirrer for at 24 hours.

4. The method as claimed in claim 1 wherein, the dried powder is grounded for at 30 minutes and calcined between 900° C. and 1000° C. for at least 24 hours.

5. The method as claimed in claim 1 wherein, the firing of the first pellets is done between 1200° C. and 1300° C. for between 12 hours and 24 hours.

6. The method as claimed in claim 1 wherein, a total repeated heating time during step g) is between 48 hours and 72 hours.

7. The method as claimed in claim 1 wherein, the sieving is done with openings of 20 to 45 µm².

8. The method as claimed in claim 1 wherein, the uniform pellets diameter is about 13 cm.

9. The method as claimed in claim 1 wherein, the pressurizing is done with a force between 5 and 6 tons.

10. The method as claimed in claim 1 wherein, the sintering is done at 1200° C. to 1300° C. between 2 and 12 hours.

* * * * *